3,488,300
PROCESS OF VARYING PRESSURE TO CONTROL
CELL SIZE OF POLYURETHANE FOAMS
Theodore B. Burkholder, Newell R. Bender, and Thomas
H. Rogers, Jr., Akron, Ohio, assignors to Goodyear
Tire & Rubber Company, Akron, Ohio, a corporation
of Ohio
No Drawing. Continuation-in-part of application Ser. No.
514,106, June 8, 1955, which is a continuation of application Ser. No. 520,017, Oct. 12, 1965. This application May 20, 1968, Ser. No. 756,077
Int. Cl. C08g 22/44
U.S. Cl. 260—2.5    4 Claims

ABSTRACT OF THE DISCLOSURE

Flexible, elastomeric, cellular polyurethanes are made by bringing together and blending an organic polyisocyanate, water and a polymeric material containing active-hydrogen atoms under varying pressure conditions ranging from 0.5 to 60 p.s.i.g. throughout the mixing of the complete reaction mixture to produce foams having uniform cell size and fissure-free characteristics.

---

This is a continuation of application Ser. No. 520,017 filed Oct. 12, 1965, now abandoned, which in turn is a continuation of application Ser. No. 514,106 filed June 8, 1955, now abandoned.

This invention relates to the preparation of flexible cellular material. More particularly, it relates to methods for preparing flexible, elastomeric, cellular structures from liquid reaction mixtures containing polyisocyanates and to improved products obtained by the use of these methods.

The production of flexible cellular structures from liquid polymeric reaction mixtures containing polyisocyanates is a comparatively recent development. The reaction mixtures from which the cellular structures are made contain polymeric materials which are either liquid at room temperature or capable of being melted at relatively low temperature. The polymeric material contains active-hydrogen atoms which react with the isocyanate groups to form a network of crosslinked molecular chains. The polyisocyanate not only functions as a chain extender and crosslinker or curative for the polymeric material, but also reacts with water and carboxyl groups present in the liquid reaction mixture to generate carbon dioxide which causes the liquid reaction mixture to expand and foam. A flexible elastomeric cellular structure is formed which retains its foamed cellular character after the polymer has been crosslinked or cured.

Examples of the active-hydrogen-containing polymeric materials useful in the practice of this invention are polyesters, polyesteramides, polyalkylene ether glycols, and mixtures of two or more of these. By the term "active-hydrogen" used to describe these polymeric materials is meant those hydrogen atoms which are reactive as measured and determined by the Zerewitinoff method. The polyesters referred to are prepared by the condensation reaction between one or more glycols and one or more dibasic carboxylic acids. The polyesteramides are prepared from one or more glycols, one or more dibasic carboxylic acids and relatively small amounts of one or more bifunctional amino compounds, such as amino carboxylic acids, amino alcohols, or diamines. Small amounts of trifunctional materials may optionally be employed in preparing the active-hydrogen-containing polyesters and polyesteramides. The polyalkylene ether glycols which may be used are hydroxyl-terminated polyethers derived from alkylene oxides or glycols or from heterocyclic ethers, such as dioxolane. Further examples of these active-hydrogen-containing polymeric materials and methods for their preparation are described in U.S. Patents 2,625,531; 2,625,532; and 2,625,535 which show polyesters and polyesteramides and U.S. Patents 2,692,873 and 2,702,797 which show the polyalkylene ether glycols. Preferred active-hydrogen-containing polymeric materials useful in the practice of this invention are the polyesters and polyesteramides having an average molecular weight of from approximately 1,000 to 5,000, an acid number not greater than 5, and a hydroxyl number from 20 to 110. Best results are obtained with polyesters having an acid number not greater than 2, a hydroxyl number of approximately 60, and an average molecular weight of approximately 2,000.

Any organic polyisocyanate or mixtures of polyisocyanates may be employed. The amount of polyisocyanate should be at least sufficient to cross-link the active-hydrogen-containing polymeric material and to react with the water present to generate carbon dioxide gas. In general it is preferred to use from 2 to 8 equivalents of isocyanate per mol of polymeric material with best results being obtained by the use of approximately 3 mols of a diisocyanate per mol of polymeric material. Representative examples of polyisocyanates which may be employed are the diisocyanates such as hexamethylene diisocyanate; para-phenylene diisocyanate; meta-phenylene diisocyanate; 4,4'-diphenylene diisocyanate; 1,5 - naphthalene diisocyanate; 4,4' - diphenylene methane diisocyanate; the tolylene diisocyanates; 4,4'-diphenyl ether diisocyanate; 3,3'-dimethyl 4,4'-diphenyl diisocyanate; and 3,3'-dimethoxy 4,4'- diphenyl diisocyanate; the triisocyanates such as 4,4',4''-triphenyl methane diisocyanate; and toluene 2,4,6 triisocyanate; the tetraisocyanates such as 4,4'-dimethyl-diphenyl methane 2,2',5,5' tetraisocyanate and mixtures of polyisocyanates such as those described in U.S. Patent 2,683,730. Of these the liquid tolylene diisocyanates, such as 2,4 tolylene diisocyanate 2,6 tolylene diisocyanate and toluene 2,4,6 triisocyanate are particularly preferred.

The water in the reatcion mixture is provided to generate the carbon dioxide gas for forming as well as to form possible points for crosslinking the polymeric material. In addition the three essential ingredients (polymer, polyisocyanate and water) the reaction mixture may optionally contain pigment fillers, reinforcing agents, coloring agents, antioxidants, and catalysts.

In the production of flexible cellular products from the reaction mixture discussed above it has been observed that when the reaction mixture is used in forming relatively large articles, cracks or fissures appear in the structure. The presence of these fissures in the cured products requires that the products be repaired or scrapped. The exact reason for the observed fissuring is not known. Modification of the reactants as well as the reaction conditions sometimes helps to reduce this tendency toward fissuring. However, no practical consistent solution to this problem has been discovered to date.

It is, therefore, the broad object of this invention to provide a method for producing flexible elastomeric cellular products from reaction mixtures comprising an active-hydrogen-containing polymeric material, polyisocyanate, and water which do not develop cracks or fissures. Another object is to improve the quality of these flexible cellular products by providing a method of manufacture which produces uniform, high quality foamed structures. Still another object is to provide a method of manufacture which permits control over the size of the cells in the foamed product. Other objects will appear as the description proceeds.

It has now been discovered that the foregoing objects may be accomplished by effecting the mixing of the reactants under pressure, operable pressures ranging from 0.5 to 60 pounds per square inch gauge. It is preferred to mix the reactants under a pressure from 3 to 15 pounds per square inch above atmospheric pressure. This pressure mixing of the complete reaction mixture containing the polymer, the polyisocyanate, the water and other optional compounding ingredients eliminates fissuring in the finished product. A positive pressure is maintained on the complete reaction mixture while the reactants are being thoroughly blended and until the reaction mixture is poured onto a casting surface or into a mold. In addition to the elimination of fissuring in the finished product, an additional advantage achieved by the practice of this invention is in the ability to control the cell size of the finished product by regulating the positive pressure employed during the mixing operation, with higher pressure producing cured foams having larger cell size.

The practice of this invention is further illustrated with reference to the following representative examples in which, unless otherwise specified, parts are shown by weight.

EXAMPLE 1

A polyester (100 parts) prepared from diethylene glycol and adipic acid and having an hydroxyl number of 71.2 and an acid number of 1.96 was thoroughly blended with 1 part of a surface-active agent, polyoxyethylated vegetable oil, 1 part of N-methyl morpholine, 2.7 parts of water and 0.5 part of hexanetriol 1,2,6. To this mixture 34 parts of a mixture of tolylene diisocyanates containing 80% by weight of 2,4 tolylene diisocyanate and 20% by weight of 2,6 tolylene diisocyanate was added and thoroughly blended with the first mixture. The mixing and blending were accomplished at atmospheric pressure. The reaction mixture was then poured into a mold and placed in an oven for one hour at 160° F. The cured foamed sample was then stripped from the mold and cut. Objectionable voids and fissures were observed throughout the cut cross section of the cured foam.

EXAMPLE 2

The same materials, proportions, and reaction conditions were used as in Example 1 except that the mixing of the complete reaction mixture was effected under a pressure varying from 0.5 to 4 pounds per square inch gauge. The cured structure exhibited a fine cell size and was completely fissure-free.

EXAMPLE 3

The same materials, proportions, and reaction conditions were used as in Example 1 except that the mixing of the complete reaction mixture was effected under a pressure varying from 4 to 8 pounds per square inch gauge. The cured structure exhibited a cell size of approximately 1/16 inch diameter and was completely fissure-free.

EXAMPLE 4

The same materials, proportions, and reaction conditions were used as in Example 1 except that the mixing of the complete reaction mixture was effected under a pressure varying from 8 to 15 pounds per square inch gauge. The cured structure exhibited a cell size of approximately 1/8 inch diameter and was completely fissure-free.

Other cured cellular products were prepared with pressures up to as high as 60 pounds per square inch gauge being employed during the mixing operation. It was observed that as the pressure increased the cell size in the cured product increased.

While certain representative embodiments and details have been shown for the purpose of illustrating the invention, it will be apparent to those skilled in this art that various changes and modifications may be made therein without departing from the spirit or scope of the invention.

What is claimed is:
1. In the method of manufacturing flexible elastomeric cellular structures wherein an organic polyisocyanate, water and an active hydrogen containing polymeric material are brought together and blended under varying pressure conditions to constitute a liquid reaction mixture for producing a flexible elastomeric cellular structure in a means for mixing and blending the complete liquid reaction mixture and from which means the complete blended liquid reaction mixture thereafter passes to means for supporting the reaction mixture during foaming and curing, the improved method of producing fissure-free flexible elastomeric products having uniform, high quality cellular structure which comprises establishing and maintaining in said mixing means a regulatable positive pressure in the range of from 0.5 to 60 pounds per square inch gauge throughout the mixing of the complete reaction mixture, whereby fissuring and the size of the cells of the cellular structure are controlled and regulating said pressure in said mixing means within said range as variations in pressure occur therein during the mixing operation to maintain uniformity and desired cell size of the flexible elastomeric cellular structure, the pressure on the complete reaction mixture in said mixing means being increased within said range when variations in the pressure in the mixing means cause the cell size of the foamed product to be finer than the desired cell size or the pressure on the complete reaction mixture in said mixing means being decreased within said range when variations in the pressure in the mixing means cause the cell size of the foamed product to be greater than the desired cell size, whereby a fissure-free flexible elastomeric product having uniform high quality cellular structure of desired cell size is obtained.

2. The method set forth in claim 1 wherein the regulatable positive pressure employed in the mixing means is regulated during the mixing operation between 0.5 and 15 pounds per square inch gauge as the pressure in the mixing means varies therebetween during the mixing operation to produce a fissure-free foamed product having a desired cell size in the range of fine up to 1/8 inch in diameter and having a uniform structure.

3. The method set forth in claim 1 wherein the regulatable positive pressure employed in the mixing means is regulated during the mixing operation between 3 and 15 pounds per square inch gauge as the pressure in the mixing means varies therebetween during the mixing operation to produce a fissure-free foamed product having a desired cell size and having a uniform structure.

4. The method set forth in claim 1 wherein the regulatable positive pressure employed in the mixing means is regulated during the mixing operation between 8 and 15 pounds per square inch gauge as the pressure in the mixing means varies therebetween during the mixing operation to produce a fissure-free foamed product having a desired cell size of approximately 1/8 inch in diameter and having a uniform structure.

References Cited

UNITED STATES PATENTS

| 2,283,604 | 5/1942 | Harrison. | |
| 2,673,723 | 3/1954 | Keen | 261—28 |
| 2,731,253 | 1/1956 | Spencer | 261—118 |

DONALD E. CZAJA, Primary Examiner

H. S. COCKERAM, Assistant Examiner

U.S. Cl. X.R.

264—54

UNITED STATES PATENT OFFICE
CERTIFICATE OF CORRECTION

Patent No. 3,488,300   Dated January 6, 1970

Inventor(s) Theodore B. Burkholder, Newell R. Bender and Thomas H. Rogers, Jr.

It is certified that error appears in the above-identified patent and that said Letters Patent are hereby corrected as shown below:

IN THE HEADING:

Delete "Continuation-in-part of application Ser. No. 514,106, June 8, 1955, which is a continuation of application Ser. No. 520,017, Oct. 12, 1965. This application May 20, 1968" and replace with -- Continuation of application Ser. No. 520,017, Oct. 12, 1965, which is a continuation of application Ser. No. 514,106, June 8, 1955. This application May 29, 1968. -- .

IN THE SPECIFICATION:

Column 2, line 40, correct the spelling of "reatcion" to -- reaction --;

line 41, change "forming" to -- foaming -- ;

line 43, between "addition" and "the" add -- to --

SIGNED AND SEALED

JUL 21 1970

(SEAL)
Attest:

Edward M. Fletcher, Jr.
Attesting Officer

WILLIAM E. SCHUYLER, JR.
Commissioner of Patents